US012673497B2

(12) United States Patent
Nie et al.

(10) Patent No.: US 12,673,497 B2
(45) Date of Patent: Jul. 7, 2026

(54) MAINTENANCE DEVICE AND INKJET RECORDING APPARATUS

(71) Applicant: KYOCERA Document Solutions Inc., Osaka (JP)

(72) Inventors: Yiquan Nie, Osaka (JP); Takashi Somete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 127 days.

(21) Appl. No.: 18/797,921

(22) Filed: Aug. 8, 2024

(65) Prior Publication Data

US 2025/0050640 A1 Feb. 13, 2025

(30) Foreign Application Priority Data

Aug. 9, 2023 (JP) ................................ 2023-130376

(51) Int. Cl.
*B41J 2/165* (2006.01)
*B41J 29/377* (2006.01)

(52) U.S. Cl.
CPC ......... *B41J 2/16508* (2013.01); *B41J 29/377* (2013.01)

(58) Field of Classification Search
CPC ................ B41J 2/16508; B41J 2/16511; B41J 2/16514; B41J 2/16505; B41J 29/377
See application file for complete search history.

(56) References Cited

U.S. PATENT DOCUMENTS 6,481,826 B1 * 11/2002 Hara .................... B41J 2/16508 347/29
2007/0247486 A1 * 10/2007 Sakurai ................ B41J 2/16523 347/30
2009/0109257 A1 * 4/2009 Shimazaki ........... B41J 2/16511 347/31
2012/0154474 A1 6/2012 Hazeyama
2013/0010028 A1 * 1/2013 Taira .................... B41J 2/16508 347/25
2016/0121613 A1 * 5/2016 Matsui ................. B41J 2/16508 347/29

FOREIGN PATENT DOCUMENTS

JP 2012131064 A 7/2012

* cited by examiner

*Primary Examiner* — Stephen D Meier
*Assistant Examiner* — Thomas Ray Knief
(74) *Attorney, Agent, or Firm* — Alleman Hall LLP

(57) ABSTRACT

A maintenance device includes: a cap to be attached to a nozzle surface of an inkjet head; and a supply portion which accumulates a humidifying medium therein, generates humidified air by causing air to pass through the humidifying medium, and supplies the humidified air to the cap via an air supply pipe that is in communication with the cap, and inside the supply portion, the air supply pipe is provided along an up-down direction in a space higher than a fluid level of the humidifying medium and is provided with a cut on at least an inner surface side of a pipe wall of the air supply pipe.

4 Claims, 13 Drawing Sheets

MAINTENANCE DEVICE AND INKJET RECORDING APPARATUS

INCORPORATION BY REFERENCE

This application is based upon and claims the benefit of priority from the corresponding Japanese Patent Application No. 2023-130376 filed on Aug. 9, 2023, the entire contents of which are incorporated herein by reference.

BACKGROUND

The present disclosure relates to a maintenance device which performs maintenance of an inkjet head, and an inkjet recording apparatus.

In an inkjet recording apparatus that uses aqueous ink, there is a fear that, while printing is not executed, moisture will evaporate from the ink in nozzles and viscosity will increase, to thus cause an ejection failure or clogging. In this regard, there has conventionally been discussed a technique of suppressing evaporation of moisture from the ink in the nozzles. As the related art, an apparatus which supplies humidified air into a cap that covers an ejection surface (a nozzle surface) of a head is being discussed.

SUMMARY

To solve the problem described above, a maintenance device according to the present disclosure includes: a cap to be attached to a nozzle surface of an inkjet head; and a supply portion which accumulates a humidifying medium therein, generates humidified air by causing air to pass through the humidifying medium, and supplies the humidified air to the cap via an air supply pipe that is in communication with the cap, and inside the supply portion, the air supply pipe is provided along an up-down direction in a space higher than a fluid level of the humidifying medium and is provided with a cut on at least an inner surface side of a pipe wall of the air supply pipe.

The cut may be provided along the up-down direction.

The cut may penetrate a lower end surface of the pipe wall.

The cut may penetrate from an inner surface to an outer surface of the pipe wall.

Further, an inkjet recording apparatus according to the present disclosure includes a plurality of the inkjet heads and any of the maintenance devices described above.

According to the present disclosure, entering of the humidifying medium in the air supply pipe can be suppressed.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an inkjet recording apparatus 1 according to an embodiment of the present disclosure will be described with reference to the drawings.

Figure 1:
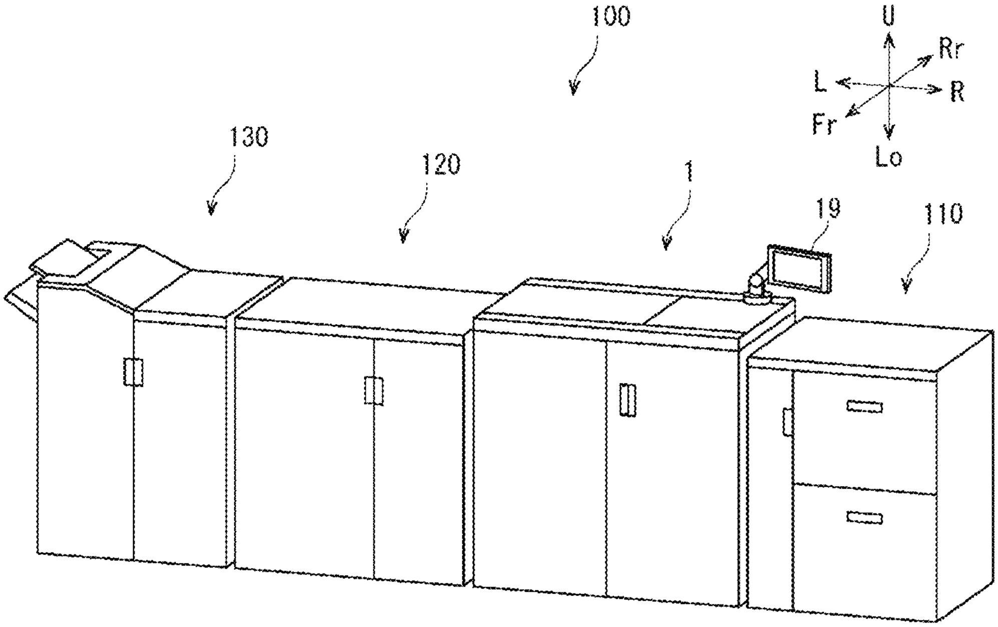
FIG. 1 is a perspective view showing an outer appearance of an image forming system according to an embodiment of the present disclosure.
Figure 2:
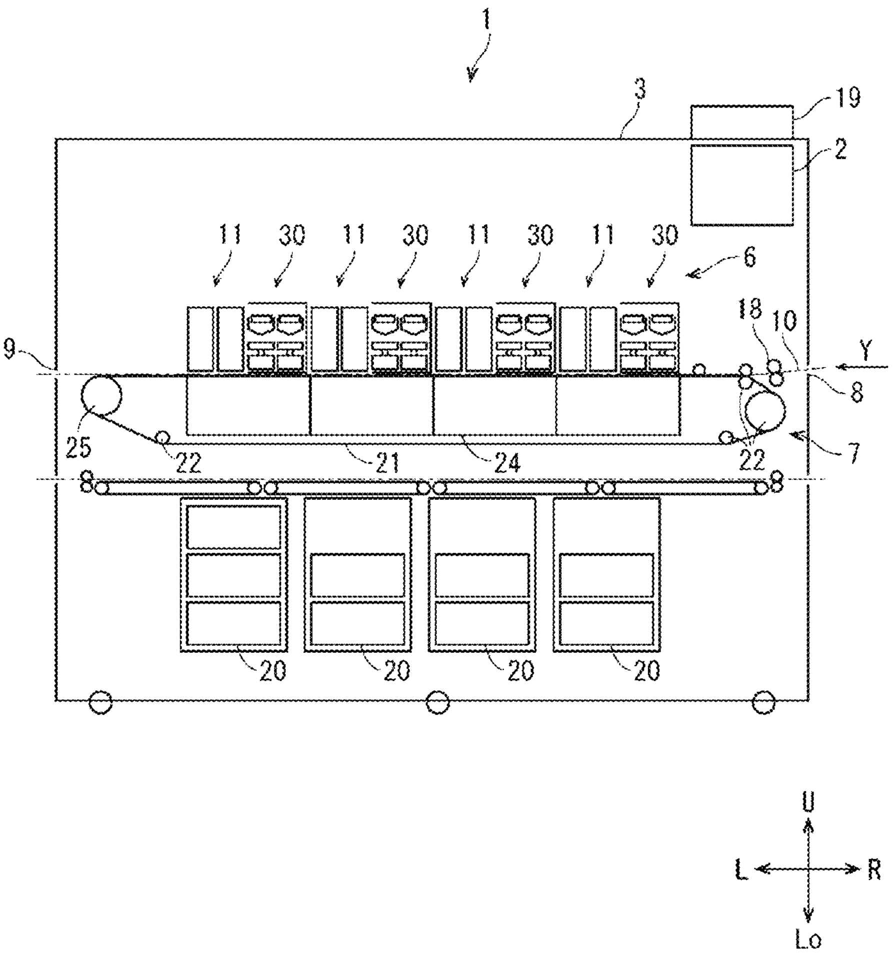
FIG. 2 is a front view schematically showing an internal configuration of an inkjet recording apparatus according to the embodiment of the present disclosure.
Figure 3:
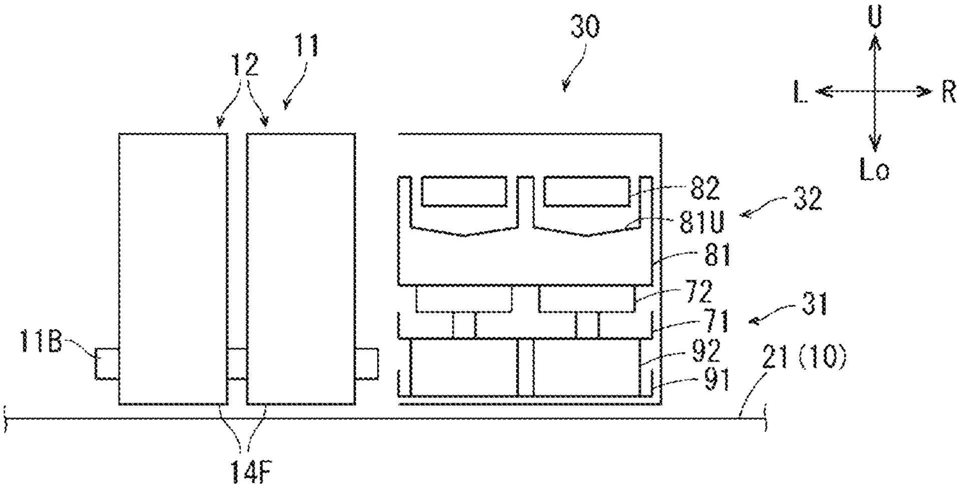
FIG. 3 is a front view schematically showing a head unit and a maintenance device according to the embodiment of the present disclosure.
Figure 4:
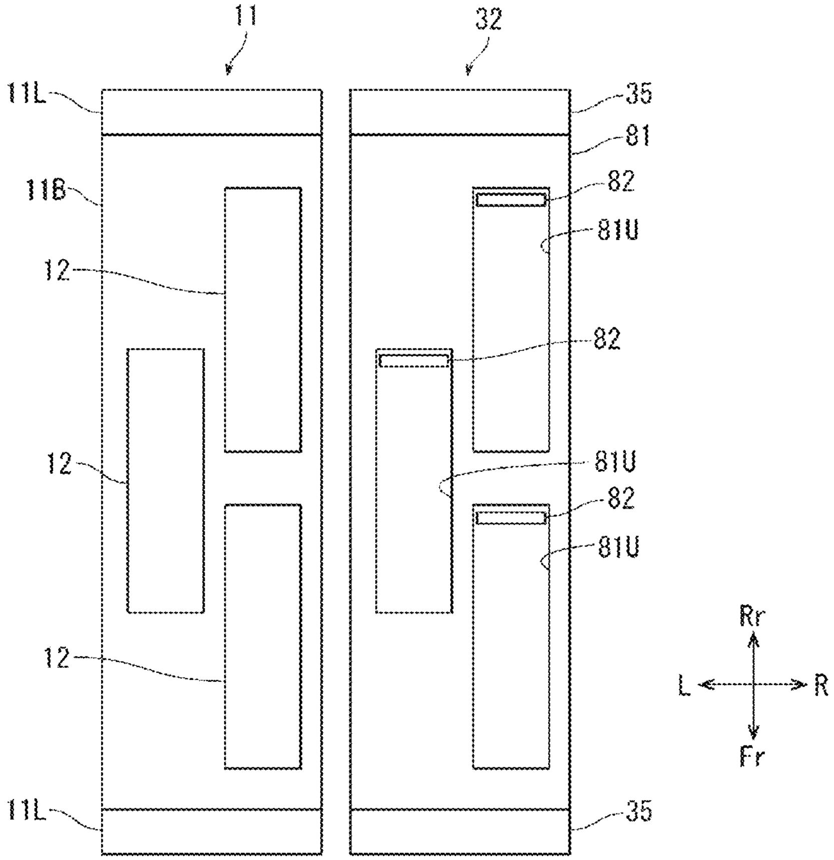
FIG. 4 is a plan view schematically showing the head unit and a wipe unit according to the embodiment of the present disclosure.
Figure 5:
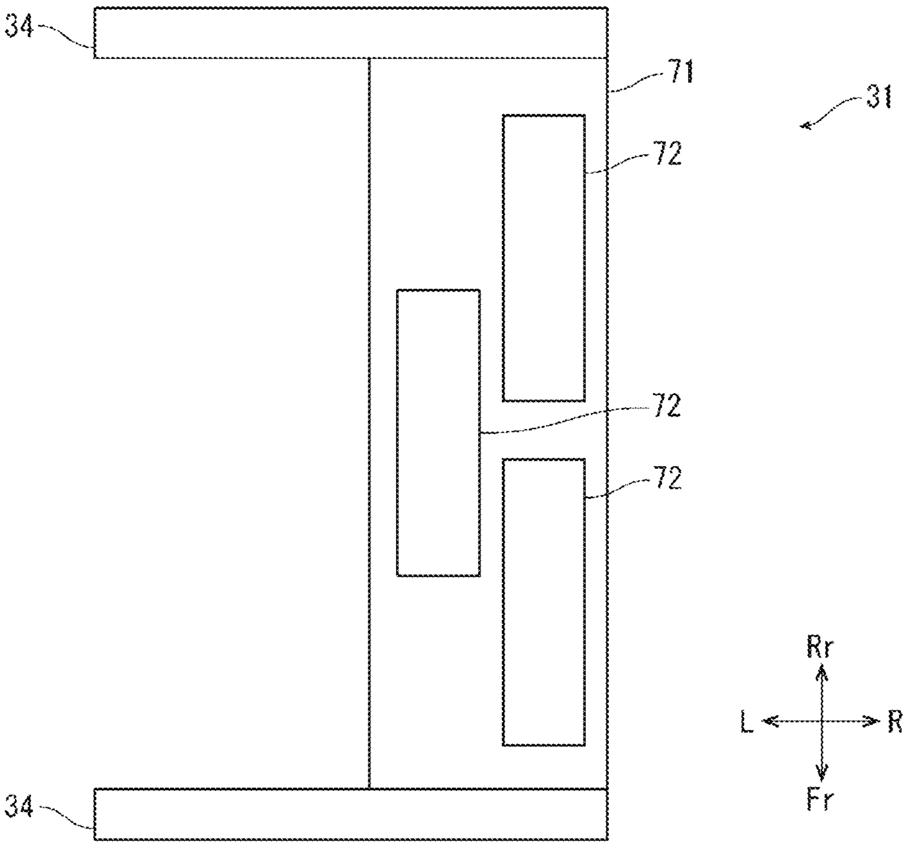
FIG. 5 is a plan view schematically showing a cap unit according to the embodiment of the present disclosure.
Figure 6:
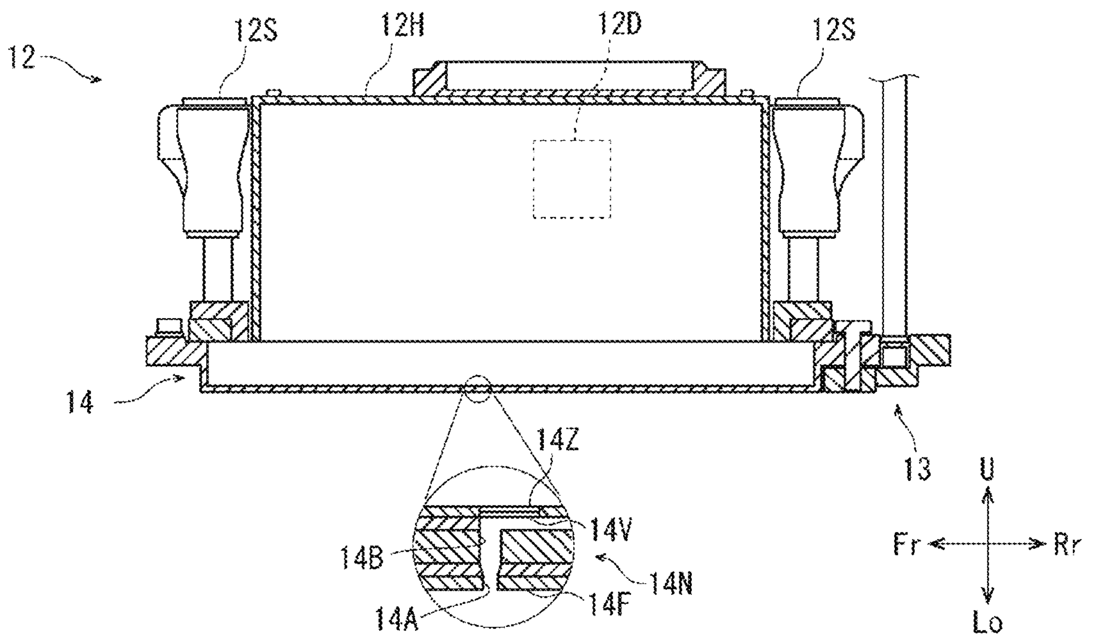
FIG. 6 is a cross-sectional view showing an inkjet head according to the embodiment of the present disclosure.
Figure 7:
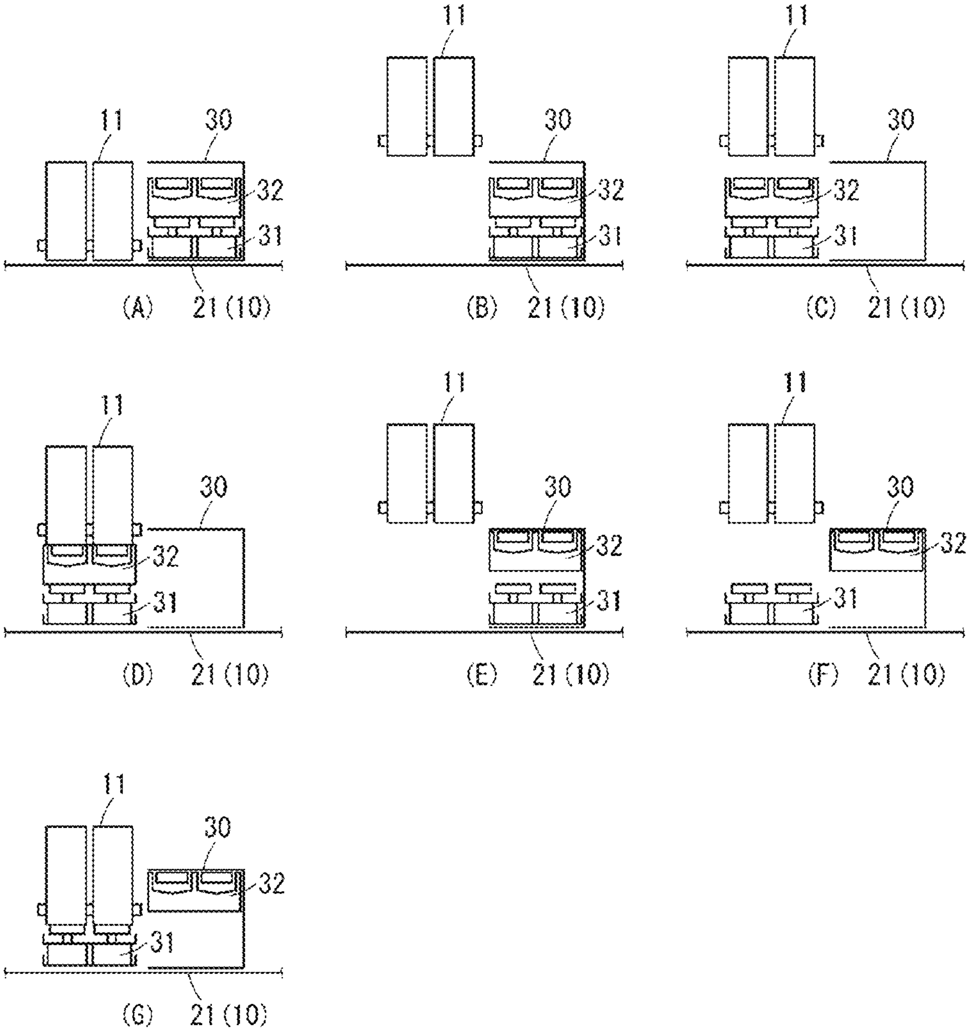
FIG. 7 are front views showing operations of the maintenance device according to the embodiment of the present disclosure.

FIG. 1 is a perspective view showing an outer appearance of an image forming system 100. FIG. 2 is a front view schematically showing an internal configuration of the inkjet recording apparatus 1. FIG. 3 is a front view schematically showing a head unit 11 and a maintenance device 30. FIG. 4 is a plan view schematically showing the head unit 11 and a wipe unit 32. FIG. 5 is a plan view schematically showing a cap unit 31. FIG. 6 is a cross-sectional view showing an inkjet head 12. FIG. 7 are front views showing operations of the maintenance device 30. Hereinafter, descriptions will be given while a near side of a sheet surface shown in FIG. 2 is set as a front surface (front side) of the inkjet recording apparatus 1 and a left-right direction is defined using a direction in which the inkjet recording apparatus 1 is seen from the front as a reference. In the respective figures, U, Lo, L, R, Fr, and Rr respectively indicate upper, lower, left, right, front, and rear.

The image forming system 100 (see FIG. 1) includes a sheet feed apparatus 110, the inkjet recording apparatus 1, a drying apparatus 120, and a post-processing apparatus 130.

The sheet feed apparatus 110 stores several thousand sheets and supplies the sheets to the inkjet recording apparatus 1. The inkjet recording apparatus 1 forms an image on the sheet using an inkjet system. The drying apparatus 120 heats the sheet conveyed from the inkjet recording apparatus 1 and dries ink. The post-processing apparatus 130 carries out post-processing such as punching, stapling, and folding on the sheet conveyed from the drying apparatus 120.

The inkjet recording apparatus 1 (see FIG. 2) includes a body housing 3 having a rectangular parallelepiped shape. At a center portion inside the body housing 3, a conveying unit 7 which causes the sheet to stick and conveys the sheet in a Y direction is provided. An imaging unit 6 which ejects ink to form an image is provided above the conveying unit 7. On a right side surface of the body housing 3, a sheet feed opening 8 through which the sheet enters from the sheet feed apparatus 110 is provided. On a left side surface of the body housing 3, a discharge opening 9 through which the sheet on which an image has been formed is discharged to the drying apparatus 120 is provided. Inside the body housing 3, a conveying path 10 that is provided from the sheet feed opening 8 to the discharge opening 9 via a gap between the conveying unit 7 and the imaging unit 6 is provided. A registration roller 18 is provided more on an upstream side of the conveying direction Y than the conveying unit 7.

The conveying unit 7 includes an endless conveying belt 21 and a suction portion 24. The conveying belt 21 includes a large number of air holes (not shown) and is wound around a drive roller 25 and a driven roller 22. An upper surface of the suction portion 24 includes a large number of air holes (not shown) and is in contact with an inner surface of the conveying belt 21. The suction portion 24 sucks in air via the air holes of the conveying belt 21 and the air holes of the suction portion 24 to thus cause the sheet to stick to the conveying belt 21. The drive roller 25 is driven in a counterclockwise direction by a drive portion (not shown) including a motor and a reduction gear so that the conveying belt 21 rotates in the counterclockwise direction and the sheet stuck to the conveying belt 21 is conveyed in the Y direction.

The imaging unit 6 includes a plurality of (four in the present embodiment) head units 11. The head unit 11 (see FIG. 3 and FIG. 4) includes one or more (three in the present embodiment) inkjet heads 12. To the head units 11, ink containers 20 respectively filled with ink of black, cyan, magenta, and yellow are connected, respectively.

The inkjet head 12 (see FIG. 6) includes a casing 12H of a rectangular parallelepiped shape, that has a front-rear direction as a longitudinal direction, a nozzle plate 14 provided at a bottom portion of the casing 12H, and a socket 12S to which a pipe for supplying ink is connected. The nozzle plate 14 includes a large number of nozzles 14N arranged in the front-rear direction. The nozzles 14N each include a branched flow path 14B that is branched from a downstream side of the socket 12S and an ejection port 14A provided on a nozzle surface 14F that is a lower surface of the nozzle plate 14. A vibration plate 14V doubles as a part of an inner wall of the branched flow path 14B. The vibration plate 14V is provided with a pressurization element 14Z. A piezoelectric device, a static actuator, a heater, or the like is used as the pressurization element 14Z. A drive circuit 12D which drives the pressurization element 14Z is connected to the pressurization element 14Z.

A control portion 2 (see FIG. 2) includes an arithmetic portion and a storage portion (not shown). The arithmetic portion is, for example, a CPU (Central Processing Unit). The storage portion includes storage media such as a ROM (Read Only Memory), a RAM (Random Access Memory), and an EEPROM (Electrically Erasable Programmable Read Only Memory). The arithmetic portion reads control programs stored in the storage portion and executes the control programs to perform various types of processing. It is noted that the control portion 2 may be realized by an integrated circuit that does not use software.

A display operation portion 19 is provided at an upper portion of the body housing 3 (see FIG. 1 and FIG. 2). The display operation portion 19 includes a display panel, a touch panel stacked on the display panel, and a keypad (not shown). The control portion 2 causes the display panel to display a screen that shows an operation menu, a status, or the like of the inkjet recording apparatus 1, and controls the respective portions of the inkjet recording apparatus 1 according to operations detected by the touch panel or the keypad.

Basic image forming operations of the inkjet recording apparatus 1 are as follows. When an image forming job is input to the inkjet recording apparatus 1 from the display operation portion 19, an external computer, or the like, the sheet feed apparatus 110 feeds the sheet to the conveying path 10 via the sheet feed opening 8, and the registration roller 18 whose rotation has been stopped corrects a skew of the sheet. As the registration roller 18 feeds the sheet to the conveying unit 7 at a predetermined timing, the conveying unit 7 causes the sheet to stick to the conveying belt 21 to convey the sheet in the Y direction. Ink is ejected onto the sheet from the inkjet heads 12, and thus images are formed. The sheet on which the images have been formed is discharged to the drying apparatus 120 via the discharge opening 9.

[Maintenance Device]

Next, the maintenance device 30 will be described. It is noted that the four head units 11 have the same configuration, and the four maintenance devices 30 have the same configuration, so descriptions below will be given on one head unit 11 and one maintenance device 30 provided on a right side of that head unit 11.

The head unit 11 includes a head base 11B (see FIG. 3 and FIG. 4) which supports the inkjet heads 12. In the head base 11B, three inkjet heads 12 are provided in a staggered pattern.

The maintenance device 30 (see FIG. 3) is provided next to the head unit 11 (the right side in the present embodiment). The maintenance device 30 includes a cap unit 31 and a wipe unit 32.

[Cap Unit]

The cap unit 31 (see FIG. 3 and FIG. 5) includes caps 72 in the same number as the inkjet heads 12 (three in the present embodiment) provided in the head unit 11. The three caps 72 are arranged in a staggered pattern similar to the inkjet heads 12 and are supported by a frame body 71. The two caps 72 are arranged on front and rear sides at positions more on the right side than a center of a left-right direction of the frame body 71, and one cap 72 is arranged on the left side. The one left-side cap 72 is arranged at an intermediate position between the two right-side caps 72 in the front-rear direction.

[Wipe Unit]

The wipe unit 32 (see FIG. 3 and FIG. 4) includes a waste tray 81 and cleaning members 82. The waste tray 81 includes concave portions 81U in the same number as the inkjet heads 12 provided in the head unit 11. The plurality of concave portions 81U are arranged in a staggered pattern similar to the inkjet heads 12. The cleaning members 82 are respectively provided in the concave portions 81U. The cleaning member 82 is, for example, a blade. The waste tray 81 includes a drive portion (not shown) which causes the cleaning members 82 to slide along the nozzle surface 14F. The waste tray 81 is placed on the plurality of caps 72. In other words, the wipe unit 32 is placed on the cap unit 31. The head unit 11 is provided with a cleaning fluid supply device 13 (see FIG. 6) which supplies a cleaning fluid to the nozzle surface 14F.

[Head Lifting and Lowering Device]

Head lifting and lowering devices 11L (see FIG. 4) are provided on front and rear sides of the head base 11B. The head lifting and lowering device 11L is configured by, for example, a ball screw, a belt drive device, or the like. The head lifting and lowering device 11L lifts and lowers the head unit 11 between an image forming position and an evacuation position. The image forming position (see FIG. 7(A)) is a position at which an interval between the conveying path 10 on which the sheet is conveyed (the upper surface of the conveying belt 21) and the nozzle surface 14F becomes a predetermined distance suited for image formation. The image forming position is a lower limit position of a lifting and lowering range of the head unit 11 by the head lifting and lowering device 11L. The evacuation position (see FIG. 7(B)) is a position at which the head unit 11 does not interfere with the wipe unit 32 when the cap unit 31 and the wipe unit 32 are caused to slide using a cap slide device 34 to be described later. The evacuation position is an upper limit position of the lifting and lowering range of the head unit 11.

[Cap Slide Device]

The cap slide devices 34 (see FIG. 5) are provided on front and rear sides of the frame body 71 of the cap unit 31. The cap slide device 34 is configured by, for example, a ball screw, a belt drive device, or the like. The cap slide device 34 causes the cap unit 31 to slide between a home position and a maintenance position. The home position (see FIG. 7(A)) is a position on the right side of the head unit 11 positioned at the image forming position. The maintenance position (see FIG. 7(F)) is a position below the head unit 11 positioned at the evacuation position.

[Wipe Lifting and Lowering Device]

Wipe lifting and lowering devices 35 (see FIG. 4) are provided on front and rear sides of the waste tray 81 of the wipe unit 32. The wipe lifting and lowering device 35 is configured by, for example, a ball screw, a belt drive device, or the like. The wipe lifting and lowering device 35 lifts and lowers the wipe unit 32 between a contact position (see FIG. 7(B)) at which the waste tray 81 comes into contact with the caps 72 and a spaced position (see FIG. 7(E)) at which the waste tray 81 is spaced apart from the caps 72 by a predetermined distance.

Figure 8:
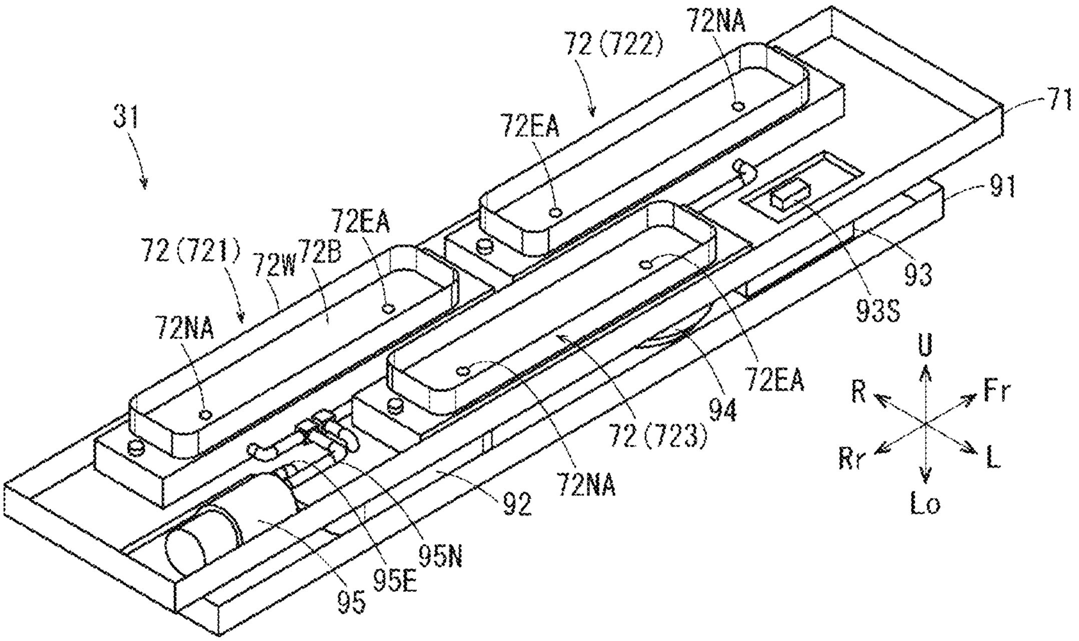
FIG. 8 is a perspective view showing the cap unit according to the embodiment of the present disclosure.
Figure 9:
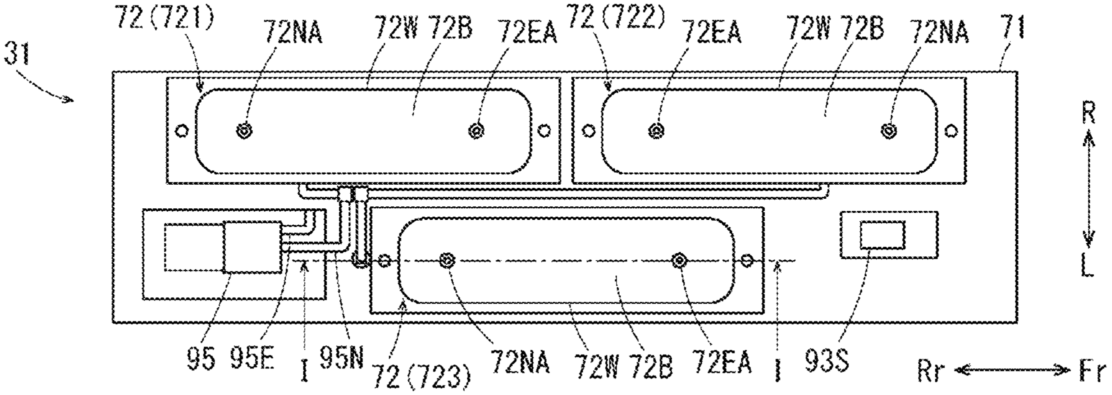
FIG. 9 is a plan view showing the cap unit according to the embodiment of the present disclosure.
Figure 10:
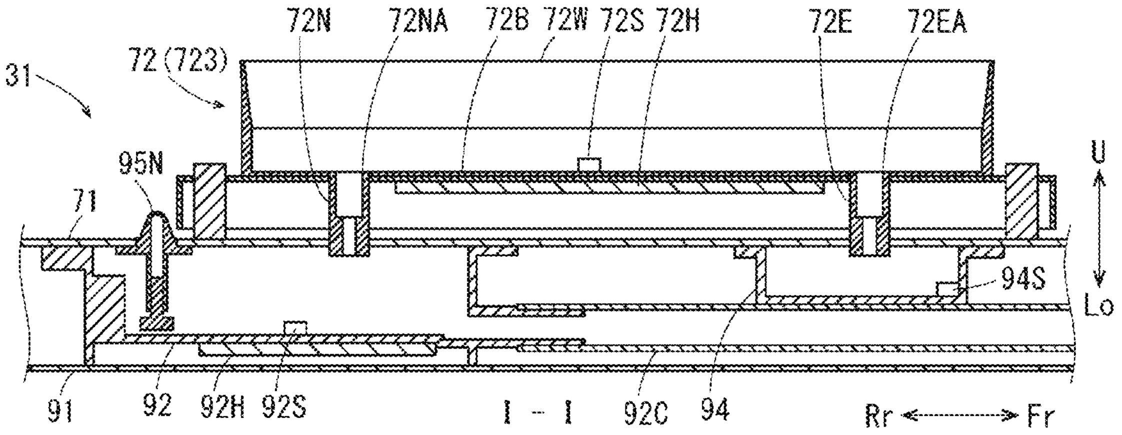
FIG. 10 is a cross-sectional view showing an I-I cross section of FIG. 9.
Figure 11:
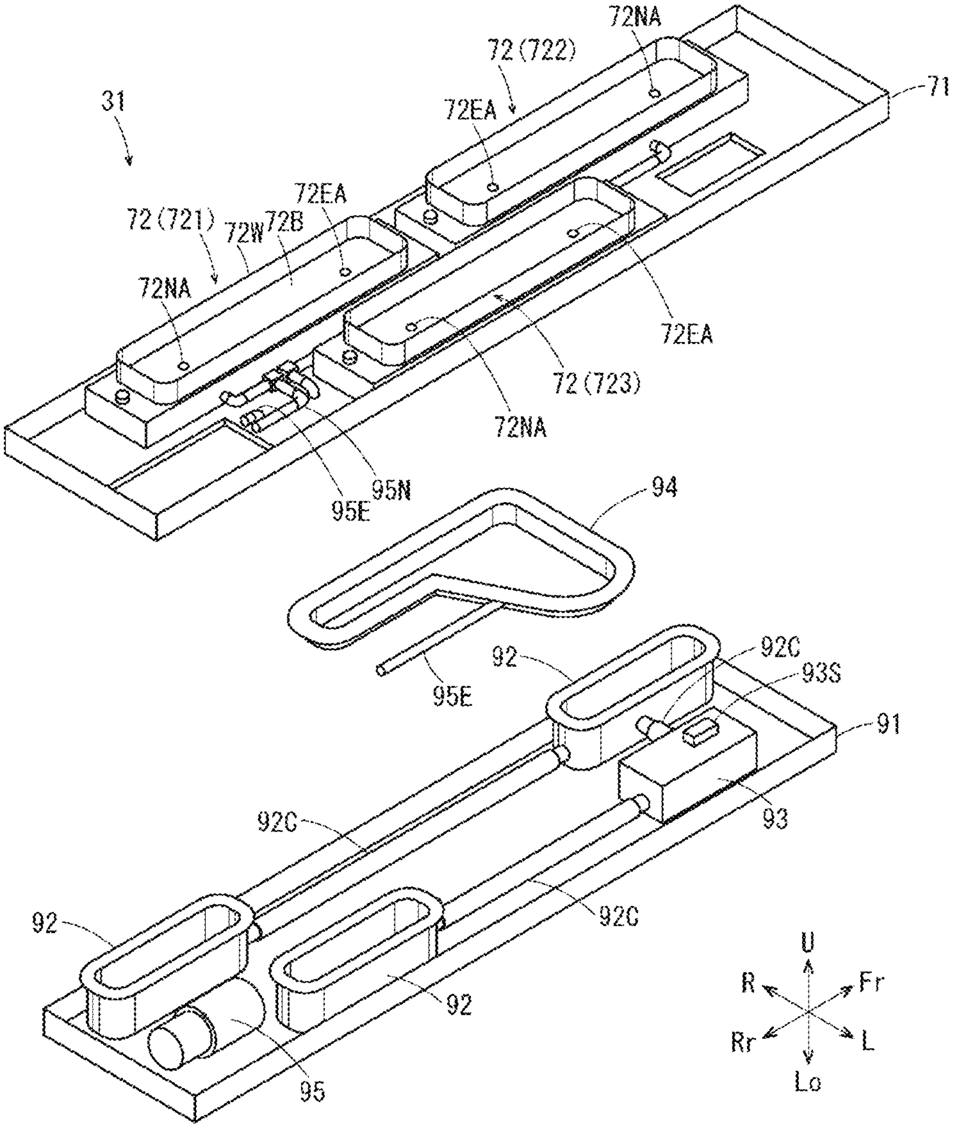
FIG. 11 is an exploded view showing the cap unit according to the embodiment of the present disclosure.
Figure 12:
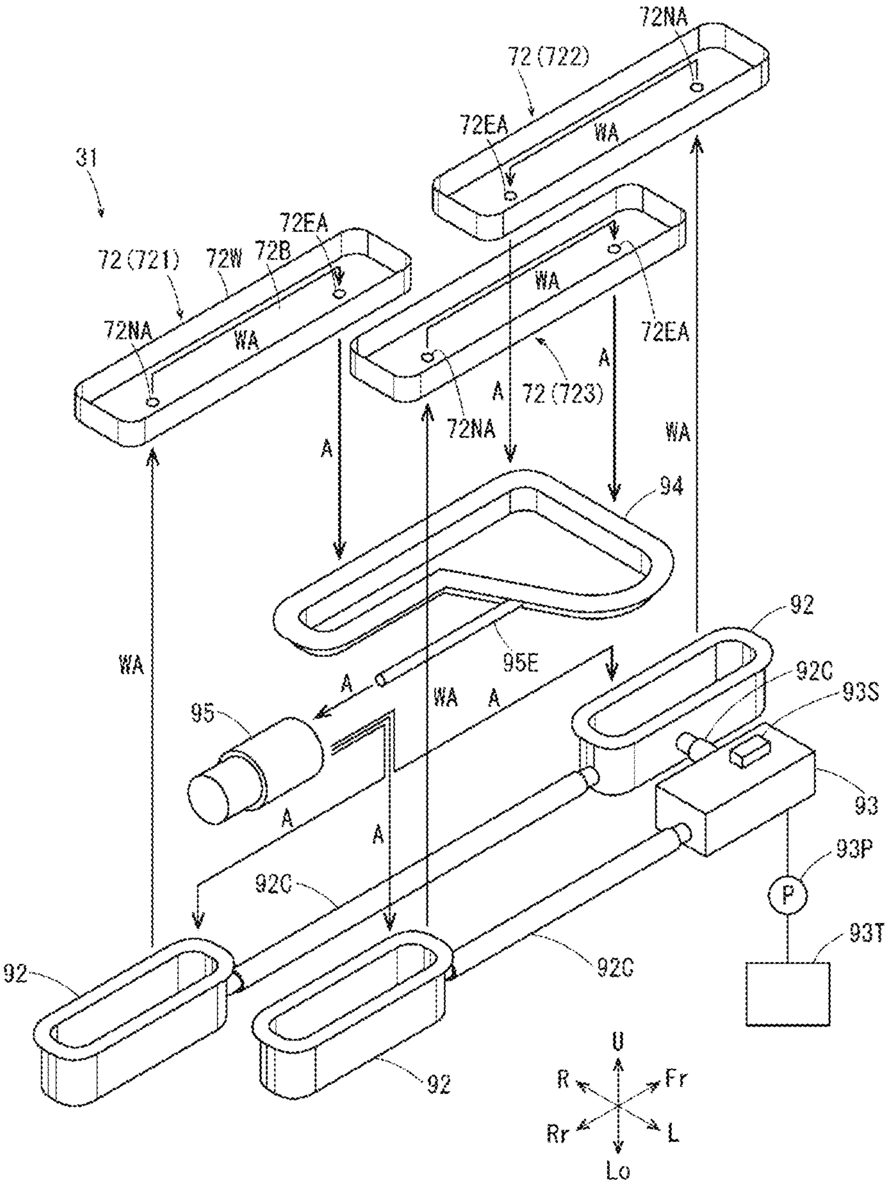
FIG. 12 is a diagram showing a flow of humidified air in the cap unit according to the embodiment of the present disclosure.
Figure 13:
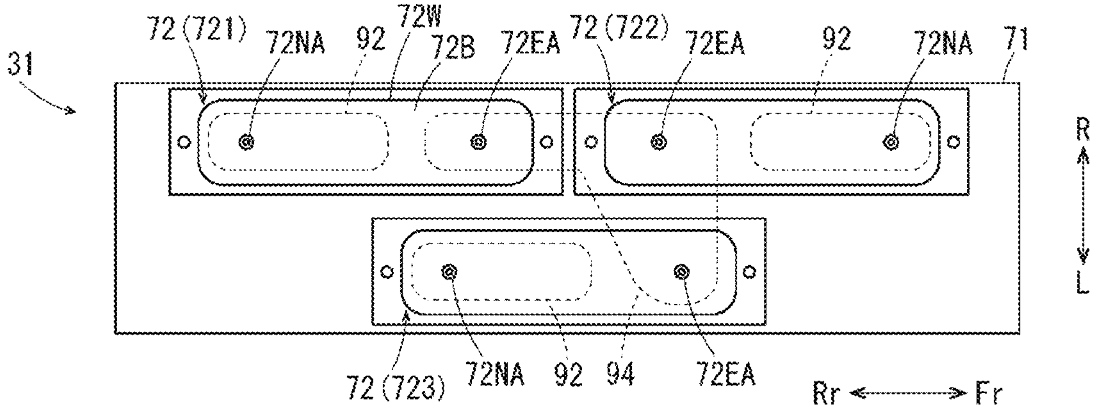
FIG. 13 is a plan view showing positions of supply portions and a recovery portion according to the embodiment of the present disclosure.
Figure 14:
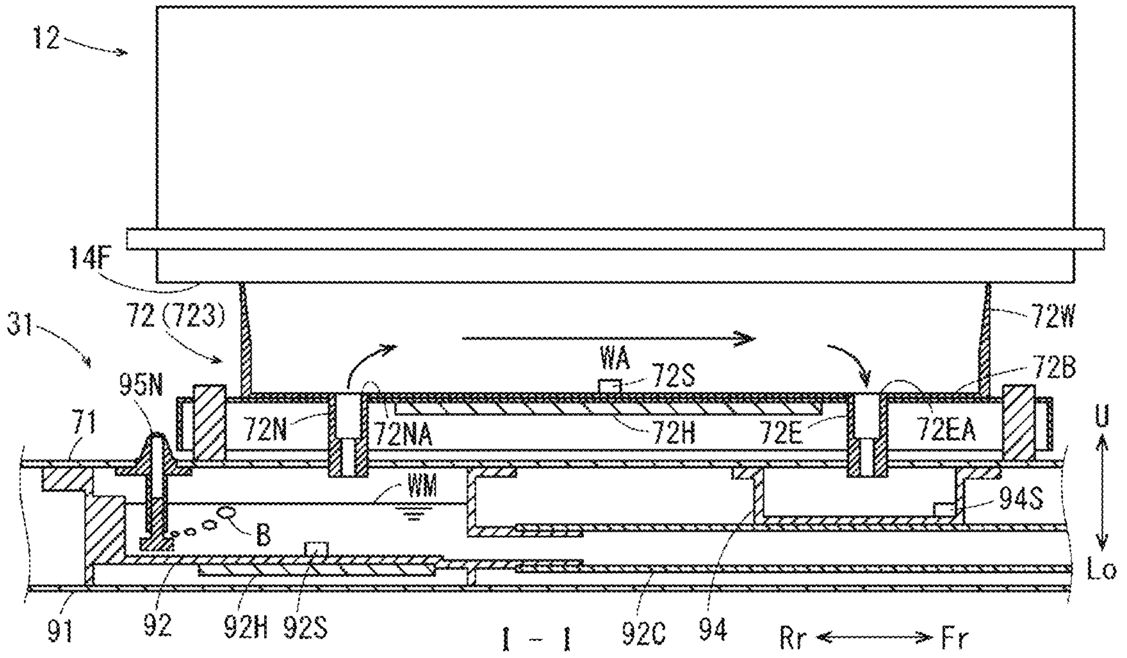
FIG. 14 is a cross-sectional view showing a flow of humidified air in the cap according to the embodiment of the present disclosure.

Next, a configuration of the cap unit 31 will be described in detail. FIG. 8 is a perspective view showing the cap unit 31. FIG. 9 is a plan view showing the cap unit 31. FIG. 10 is a cross-sectional view showing an I-I cross section of FIG. 9. FIG. 11 is an exploded view showing the cap unit 31. FIG. 12 is a diagram showing a flow of humidified air WA in the cap unit 31. FIG. 13 is a plan view showing positions of supply portions 92 and a recovery portion 94. FIG. 14 is a cross-sectional view showing a flow of humidified air WA in the cap 72.

The maintenance device 30 according to the present embodiment includes a plurality of caps 72 to be attached to the nozzle surfaces 14F of the inkjet heads 12, the air supply opening 72NA and the exhaust opening 72EA provided in each of the plurality of caps 72, one recovery portion 94 which recovers air A from the exhaust openings 72EA of all of the caps 72, and a plurality of supply portions 92 that are respectively provided for the caps 72 and supply the humidified air WA obtained by humidifying the air A recovered by the recovery portion 94 to the air supply openings 72NA, the plurality of supply portions 92 are arranged about the one recovery portion 94, and in each of the plurality of caps 72, the exhaust opening 72EA is provided on the recovery portion 94 side and the air supply opening 72NA is provided on the supply portion 92 side.

The plurality of caps 72 include a first cap 721, a second cap 722, and a third cap 723, the first cap 721 and the second cap 722 are arranged along a predetermined direction (for example, the front-rear direction), the third cap 723 is arranged at an intermediate position between the first cap 721 and the second cap 722 in the predetermined direction and is arranged at a position different from those of the first cap 721 and the second cap 722 in a direction intersecting with the predetermined direction, the exhaust opening 72EA of the first cap 721 is provided on the second cap 722 side, and the exhaust opening 72EA of the second cap 722 is provided on the first cap 721 side.

[Cap]

The caps 72 (see FIG. 8 to FIG. 10) are each formed in a box shape that is opened upwardly. The cap 72 includes a bottom portion 72B substantially in a rectangular shape, that has the front-rear direction as a longitudinal direction, and a side wall portion 72W erected upwardly from an edge of the bottom portion 72B. The side wall portion 72W is formed of a material having flexibility, such as rubber. The bottom portion 72B is provided with the air supply opening 72NA and the exhaust opening 72EA.

The three caps 72 are arranged in a staggered pattern. The first cap 721 is arranged on a right rear side of the frame body 71, the second cap 722 is arranged on the front side of the first cap 721, and the third cap 723 is arranged on the left side of the frame body 71. In the first cap 721 and the third cap 723, the exhaust opening 72EA is provided on the front side, and the air supply opening 72NA is provided on the rear side. In the second cap 722, the exhaust opening 72EA is provided on the rear side, and the air supply opening 72NA is provided on the front side. It is noted that the exhaust opening 72EA may alternatively be provided on the front side and the air supply opening 72NA may alternatively be provided on the rear side in the second cap 722.

[Supply Portion, Recovery Portion]

The supply portions 92 in the same number as the caps 72 (three in the present embodiment) and one recovery portion 94 are provided below the frame body 71 (see FIG. 8 and FIG. 11 to FIG. 13). The supply portions 92 and the recovery portion 94 are each a tank which accumulates fluid therein. The supply portions 92 and the recovery portion 94 are supported by a frame body 91. The supply portions 92 are respectively arranged below the air supply openings 72NA of the caps 72. The recovery portion 94 has a shape that overlaps with all of the exhaust openings 72EA in a plan view and is arranged below all of the exhaust openings 72EA.

In other words, the three supply portions 92 are arranged about the one recovery portion 94, and in each of the three caps 72, the exhaust opening 72EA is provided on the recovery portion 94 side, and the air supply opening 72NA is provided on the supply portion 92 side. That is, all of the exhaust openings 72EA overlap with the recovery portion 94 in the up-down direction, and in each of the plurality of caps 72, the air supply opening 72NA overlaps with the supply portion 92 in the up-down direction.

An air supply pipe 72N (see FIG. 10) that brings the cap 72 and the supply portion 92 below that cap 72 in communication with each other is connected to the air supply opening 72NA of each of the caps 72. An exhaust pipe 72E that brings the cap 72 and the recovery portion 94 in communication with each other is connected to the exhaust opening 72EA of each of the caps 72. In other words, the three caps 72 are in communication with the recovery portion 94.

An air pump 95 is connected to the recovery portion 94 by a recovery flow path 95E (see FIG. 8, FIG. 9, and FIG. 11) and is connected to all of the supply portions 92 by a supply flow path 95N. The air pump 95 recovers air A having a lowered water vapor pressure from the recovery portion 94 via the recovery flow path 95E and supplies the recovered air A to all of the supply portions 92 via the supply flow path 95N (see FIG. 12).

All of the supply portions 92 are connected to a sub-tank 93 via communication pipes 92C (see FIG. 10, FIG. 11, and FIG. 12). A tank 93T and a pump 93P are connected to the sub-tank 93. A humidifying medium WM (see FIG. 14) is accumulated in the tank 93T. The humidifying medium WM is, for example, water, but may be any fluid as long as it contains water. The pump 93P supplies the humidifying medium WM from the tank 93T to the sub-tank 93.

The sub-tank 93 is provided with a sensor 93S (see FIG. 8, FIG. 9, FIG. 11, and FIG. 12) which detects an amount of the humidifying medium WM in the sub-tank 93. The sensor 93S detects, for example, a height of a fluid level in the sub-tank 93. The supply portion 92 is provided with a first heating portion 92H (see FIG. 10) which heats the supply portion 92. The cap 72 is provided with a second heating portion 72H which heats the cap 72. The supply portion 92 is provided with a sensor 92S which measures a temperature in the supply portion 92. The cap 72 is provided with a sensor 72S which measures a temperature in the cap 72. The recovery portion 94 is provided with a sensor 94S which measures at least one of a temperature and a humidity in the recovery portion 94.

[Air Supply Pipe]

Incidentally, when the air A is supplied to the humidifying medium WM accumulated in the supply portion 92, the fluid level of the humidifying medium WM partially rises due to the air A, and thus the humidifying medium WM may enter the air supply pipe 72N. When the humidifying medium WM that has entered adheres onto an inner surface of the air supply pipe 72N, a flow path of the air supply pipe 72N is narrowed or blocked to inhibit the supply of the humidified air WA. Moreover, the adhered humidifying medium WM may be pushed by the humidified air WA to enter the cap 72. When the humidifying medium WM enters the cap 72, it becomes difficult to control the temperature and humidity inside the cap 72. Although it is possible to prevent the humidifying medium WM from entering by increasing a distance between a connection portion of the air supply pipe 72N and the fluid level, a large water depth is advantageous for raising a humidifying effect. To satisfy these two requests, the size of the tanks needs to be increased, thus leading to a problem of an increase of the apparatus size.

In this regard, the maintenance device 30 according to the present embodiment includes the cap 72 to be attached to the nozzle surface 14F of the inkjet head 12, and the supply portion 92 which accumulates the humidifying medium WM therein, generates the humidified air WA by causing the air A to pass through the humidifying medium WM, and supplies the humidified air WA to the cap 72 via the air supply pipe 72N that is in communication with the cap 72, and inside the supply portion 92, the air supply pipe 72N is provided along the up-down direction in a space higher than the fluid level of the humidifying medium WM and is provided with a cut 72NS on at least an inner surface side of a pipe wall 72NW of the air supply pipe 72N. Specifically, the configuration is as follows.

Figure 15:
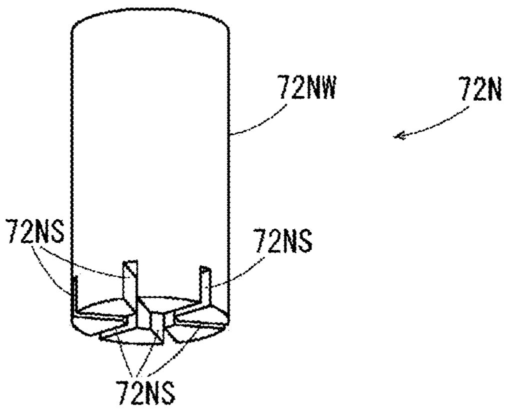
FIG. 15 is a perspective view showing an air supply pipe according to the embodiment of the present disclosure.

FIG. 15 is a perspective view showing the air supply pipe 72N. The air supply pipe 72N includes the cylindrical pipe wall 72NW having the up-down direction as a longitudinal direction. An upper end portion of the pipe wall 72NW is connected to the air supply opening 72NA. A lower end portion of the pipe wall 72NW is arranged in a space higher than the fluid level of the humidifying medium WM accumulated in the supply portion 92. On the pipe wall 72NW, cuts 72NS formed along the longitudinal direction are provided within a predetermined range including the lower end portion of the pipe wall 72NW. The cuts 72NS penetrate the lower end portion of the pipe wall 72NW. The cuts 72NS penetrate from an inner surface to an outer surface of the pipe wall 72NW. The cuts 72NS are provided at regular intervals at six positions in a circumferential direction of the pipe wall 72NW.

Next, basic operations of the maintenance device 30 will be described. In an initial state (see FIG. 7(A)), the head unit 11 is positioned at the image forming position, and the cap unit 31 is positioned at the home position. The wipe unit 32 is placed on the cap unit 31. In other words, the waste tray 81 is in contact with the caps 72. The control portion 2 executes processing described below at a predetermined timing. The predetermined timing is, for example, a timing at which a rise in viscosity of the ink in the nozzles 14N is predicted to occur, and is specifically a case where a period during which the image forming job is not executed continues for a predetermined period of time, or the like.

First, the control portion 2 activates the head lifting and lowering devices 11L to lift the head unit 11 to the evacuation position (see FIG. 7(B)). Next, the control portion 2 activates the cap slide devices 34 to cause the cap unit 31 to slide to the maintenance position (see FIG. 7(C)). At this time, since the wipe unit 32 is placed on the cap unit 31, the wipe unit 32 also slides to the maintenance position together with the cap unit 31. Next, the control portion 2 activates the head lifting and lowering devices 11L to lower the head unit 11 to a height at which the nozzle surface 14F comes into contact with the cleaning members 82 (see FIG. 7(D)).

Next, after forcing the inkjet heads 12 to eject a predetermined amount of ink, the control portion 2 supplies the cleaning fluid to the nozzle surface 14F and causes the cleaning members 82 to slide along the nozzle surface 14F. Consequently, ink remaining on the nozzle surface 14F is diluted by the cleaning fluid, and waste fluid containing the ink and the cleaning fluid is scraped by the cleaning members 82 and drops to the waste tray 81.

Next, the control portion 2 activates the head lifting and lowering devices 11L to lift the head unit 11 to the evacuation position (see FIG. 7(C)). Next, the control portion 2 activates the cap slide devices 34 to cause the cap unit 31 and the wipe unit 32 to slide to the home position (see FIG. 7(B)).

Next, the control portion 2 activates the wipe lifting and lowering devices 35 to lift the wipe unit 32 to the spaced position (see FIG. 7(E)). Next, the control portion 2 activates the cap slide devices 34 to cause the cap unit 31 to slide to the maintenance position (see FIG. 7(F)). At this time, since the wipe unit 32 is separated from the cap unit 31, the wipe unit 32 remains at the home position, and only the cap unit 31 slides to the maintenance position.

Next, the control portion 2 activates the head lifting and lowering devices 11L to lower the head unit 11 to a height at which the nozzle surface 14F comes into contact with the caps 72 (see FIG. 7(G)). Thus, the caps 72 are attached to the nozzle surface 14F.

Next, the control portion 2 humidifies the inside of the caps 72. The control portion 2 monitors measurement values obtained by the sensor 93S and maintains the height of the fluid level in the sub-tank 93 within a predetermined range. Specifically, when the measurement value of the fluid level falls below the predetermined range, the humidifying medium WM is replenished only by a predetermined amount from the tank 93T to the sub-tank 93 using the pump 93P. Since the sub-tank 93 is in communication with the supply portions 92 by the communication pipes 92C, the height of the fluid level of the humidifying medium WM becomes uniform in the sub-tank 93 and all of the supply portions 92.

The air pump 95 (see FIG. 12) recovers the air A having a lowered water vapor pressure from the recovery portion 94 via the recovery flow path 95E and supplies the recovered air A to all of the supply portions 92 via the supply flow path 95N. An end portion of the supply flow path 95N on the supply portion 92 side is arranged to be lower than the fluid level of the humidifying medium WM (see FIG. 14). Therefore, inside the supply portion 92, the air A is blown into the humidifying medium WM to cause air bubbles B. Until the air bubbles B surface the fluid level, a water vapor pressure of the air bubbles B rises. In addition, since the humidifying medium WM inside the supply portion 92 is heated by the first heating portion 92H, water vapor is likely to be generated. Therefore, the humidified air WA having an increased water vapor pressure fills the space higher than the fluid level in the supply portion 92, and the humidified air WA flows into the cap 72 via the air supply pipe 72N. It is noted that the air pump 95 may perform the recovery and supply of the air A either consecutively or intermittently.

On the other hand, since the air A is sucked by the air pump 95 in the recovery portion 94, a negative pressure is generated. Therefore, inside the cap 72, an airflow of the humidified air WA that flows from the air supply opening 72NA toward the exhaust opening 72EA is generated. In addition, since the humidified air WA to be supplied to the cap 72 is heated by the first heating portion 92H, a convection flow is generated in the cap 72, and the humidified air WA having a high temperature is supplied to the nozzle surface 14F. Thus, the humidified air WA comes into contact with the ink in the nozzles 14N, and the rise in viscosity of the ink is suppressed.

When the air A is supplied to the humidifying medium WM, the fluid level of the humidifying medium WM partially rises, and thus the humidifying medium WM may enter the air supply pipe 72N. However, in the present embodiment, when the fluid level of the humidifying medium WM rises, the humidifying medium WM returns to the fluid level via the cuts 72NS provided in the pipe wall 72NW, so the entering of the humidifying medium WM in the air supply pipe 72N can be suppressed. As a result, the entering of the humidifying medium WM in the cap 72 can also be suppressed. In addition, since the entering of the humidifying medium WM is suppressed without increasing the distance between the lower end portion of the air supply pipe 72N and the fluid level of the humidifying medium WM, the supply portion 92 can be downsized.

In addition to the control described above, the control portion 2 performs temperature control of the respective portions. Specifically, each of the inkjet heads 12 is provided with a sensor (not shown) which measures a temperature of the inkjet head 12 (for example, a temperature of the ink in the nozzles 14N). Moreover, as described above, the supply portion 92 is provided with the first heating portion 92H (see FIG. 10) which heats the supply portion 92. The cap 72 is provided with the second heating portion 72H which heats the cap 72. The supply portion 92 is provided with the sensor 92S which measures the temperature in the supply portion 92. The cap 72 is provided with the sensor 72S which measures the temperature in the cap 72. The recovery portion 94 is provided with the sensor 94S which measures at least one of the temperature and the humidity in the recovery portion 94.

The control portion 2 monitors the measurement values obtained by the sensor 92S and controls the first heating portion 92H such that the temperature of the supply portion 92 becomes equal to or higher than the temperature of the inkjet head 12. If the temperature of the supply portion 92 is lower than the temperature of the inkjet head 12, the humidity of the humidified air WA supplied from the supply portion 92 may become lower than that in the nozzles 14N of the inkjet head 12. In this case, the humidifying effect with respect to the ink in the nozzles 14N cannot be obtained. In contrast, in the present embodiment, the humidified air WA having a humidity higher than that in the nozzles 14N of the inkjet head 12 is supplied.

Further, the control portion 2 monitors the measurement values obtained by the sensor 72S and controls the second heating portion 72H such that the temperature of the cap 72 becomes equal to or higher than the temperature of the supply portion 92. If the temperature of the cap 72 is lower than the temperature of the supply portion 92, the temperature of the humidified air WA supplied from the supply portion 92 is lowered in the cap 72. When the temperature of the humidified air WA is lowered to become equal to or lower than a dew point, dew condensation is generated and the humidity in the cap 72 is lowered, and thus the humidifying effect cannot be obtained. In contrast, in the present embodiment, since the temperature of the humidified air WA is not lowered in the cap 72, there is no fear that the humidity in the cap 72 will be lowered due to the dew condensation.

When executing the image forming job, the control portion 2 activates the head lifting and lowering devices 11L to lift the head unit 11 to the evacuation position (see FIG. 7(F)), activates the cap slide devices 34 to cause the cap unit 31 to slide to the home position (see FIG. 7(E)), and activates the wipe lifting and lowering devices 35 to lower the wipe unit 32 to the contact position (see FIG. 7(B)). Then, the control portion 2 activates the head lifting and lowering devices 11L to lower the head unit 11 to the image forming position, and executes the image forming job.

The maintenance device 30 according to the present embodiment described above includes the cap 72 to be attached to the nozzle surface 14F of the inkjet head 12, and the supply portion 92 which accumulates the humidifying medium WM therein, generates the humidified air WA by causing the air A to pass through the humidifying medium WM, and supplies the humidified air WA to the cap 72 via the air supply pipe 72N that is in communication with the cap 72, and inside the supply portion 92, the air supply pipe 72N is provided along the up-down direction in the space higher than the fluid level of the humidifying medium WM and is provided with the cut 72NS on at least the inner surface side of the pipe wall 72NW of the air supply pipe 72N. With this configuration, when the fluid level of the humidifying medium WM rises above the lower end portion of the air supply pipe 72N, the humidifying medium WM escapes through the cut 72NS provided in the pipe wall 72NW, and thus the entering of the humidifying medium WM in the air supply pipe 72N can be suppressed. As a result, the entering of the humidifying medium WM in the cap 72 can also be suppressed. In addition, since the entering of the humidifying medium WM is suppressed without increasing the distance between the lower end portion of the air supply pipe 72N and the fluid level of the humidifying medium WM, the supply portion 92 can be downsized.

Further, according to the maintenance device 30 according to the present embodiment, the cut 72NS is provided along the up-down direction. With this configuration, since the humidifying medium WM drops along the cut 72NS, discharge of the humidifying medium WM from the air supply pipe 72N can be facilitated.

Furthermore, according to the maintenance device 30 according to the present embodiment, the cut 72NS penetrates a lower end surface of the pipe wall 72NW. With this configuration, discharge of the humidifying medium WM from the air supply pipe 72N can be facilitated.

Moreover, according to the maintenance device 30 according to the present embodiment, the cut 72NS penetrates from an inner surface to an outer surface of the pipe wall 72NW. With this configuration, since the humidifying medium WM is discharged in a direction that is directed from the inner surface to the outer surface of the pipe wall 72NW, discharge of the humidifying medium WM from the air supply pipe 72N can be facilitated. In addition, since the humidified air WA is supplied via the cut 72NS, supply of the humidified air WA can be facilitated.

Further, the inkjet recording apparatus 1 according to the present embodiment includes the plurality of inkjet heads 12 and the maintenance device 30. With this configuration, a rise in viscosity of the ink in the nozzles 14N can be suppressed.

The embodiment above may be modified as follows.

Figure 16:
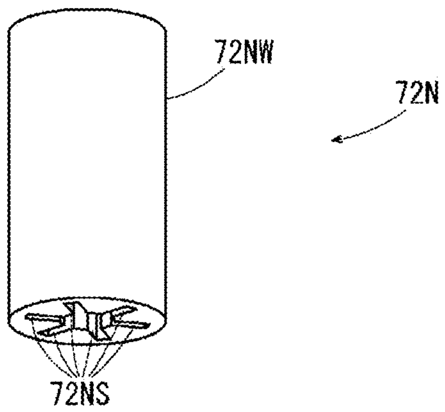
FIG. 16 is a perspective view showing an air supply pipe according to a first modified example of the embodiment of the present disclosure.

FIG. 16 is a perspective view showing the air supply pipe 72N according to a first modified example. In the present modified example, although the cuts 72NS penetrate the lower end portion of the pipe wall 72NW, the cuts 72NS do not penetrate from the inner surface to the outer surface of the pipe wall 72NW, and the cuts 72NS are provided only on the inner surface side of the pipe wall 72NW. Also by the present modified example, when the fluid level of the humidifying medium WM rises above the lower end portion of the air supply pipe 72N, the humidifying medium WM escapes through the cuts 72NS, so the entering of the humidifying medium WM in the air supply pipe 72N can be suppressed.

Figure 17:
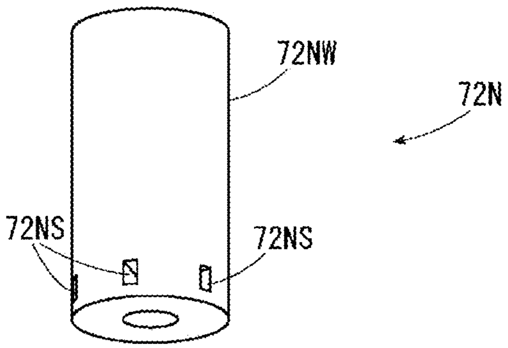
FIG. 17 is a perspective view showing an air supply pipe according to a second modified example of the embodiment of the present disclosure.

FIG. 17 is a perspective view showing the air supply pipe 72N according to a second modified example. In the present modified example, although the cuts 72NS penetrate from the inner surface to the outer surface of the pipe wall 72NW, the cuts 72NS do not penetrate the lower end portion of the pipe wall 72NW. According to the present modified example, when the fluid level of the humidifying medium WM rises above the lower end portion of the air supply pipe 72N, the humidified air WA is supplied via the cuts 72NS, so the supply of the humidified air WA can be continued. In this case, since the humidified air WA flows above the fluid level, the entering of the humidifying medium WM in the air supply pipe 72N can be suppressed. In addition, when the fluid level of the humidifying medium WM rises above a lowermost portion of the cuts 72NS, the humidifying medium WM is discharged via the cuts 72NS, so the entering of the humidifying medium WM in the air supply pipe 72N can be suppressed.

The number and intervals of the cuts 72NS may differ from those of the embodiment above. For example, the number of cuts 72NS may be one, or may be two or more. In addition, when the plurality of cuts 72NS are provided, the intervals of the cuts 72NS in the circumferential direction do not need to be regular intervals. Moreover, the air supply pipe 72N may take any shape such as a rectangular cylinder, for example.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A maintenance device, comprising:

a cap configured to be attached to a nozzle surface of an inkjet head; and a supply portion configured to accumulate a humidifying medium therein, generate humidified air by causing air to pass through the humidifying medium, and supply the humidified air to the cap via an air supply pipe that is in communication with the cap, wherein inside the supply portion, the air supply pipe is provided along an up-down direction in a space higher than a fluid level of the humidifying medium and is provided with a cut on at least an inner surface side of a pipe wall of the air supply pipe, and the cut penetrates from an inner surface to an outer surface of the pipe wall.

2. The maintenance device according to claim 1, wherein the cut is provided along the up-down direction.

3. The maintenance device according to claim 2, wherein the cut penetrates a lower end surface of the pipe wall.

4. An inkjet recording apparatus, comprising:

a plurality of the inkjet heads; and the maintenance device according to claim 1.

* * * * *